D. V. McILWAIN.
BALL BEARING.
APPLICATION FILED JUNE 9, 1914.
1,185,114.
Patented May 30, 1916.
2 SHEETS—SHEET 1.
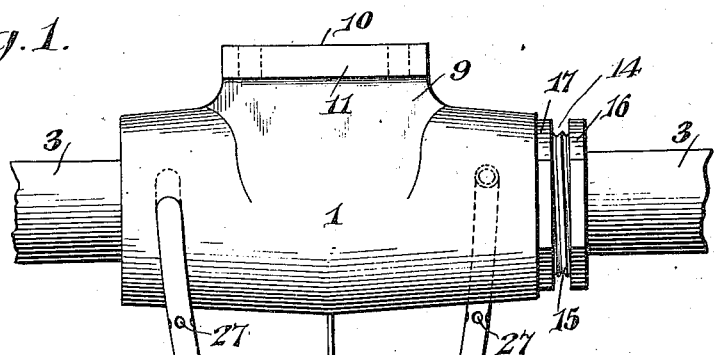
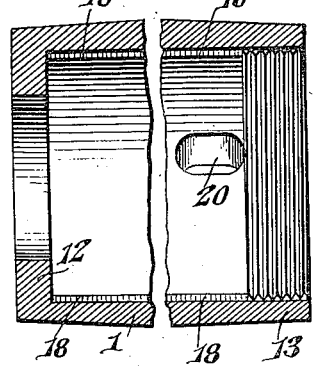
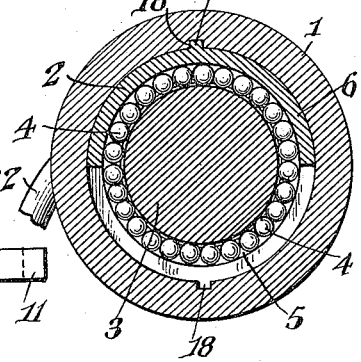
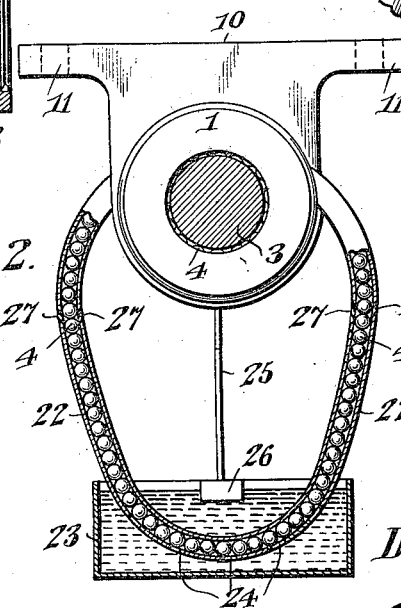
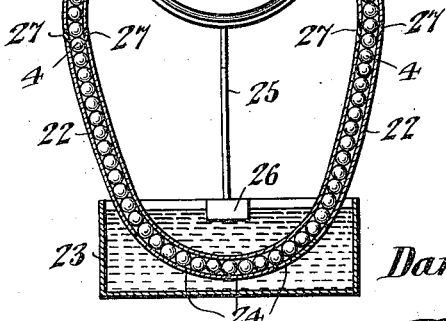
Daneil V. McIlwain,
INVENTOR
BY
ATTORNEY
WITNESSES D. V. McILWAIN.
BALL BEARING.
APPLICATION FILED JUNE 9, 1914.
1,185,114.
Patented May 30, 1916.
2 SHEETS—SHEET 2.
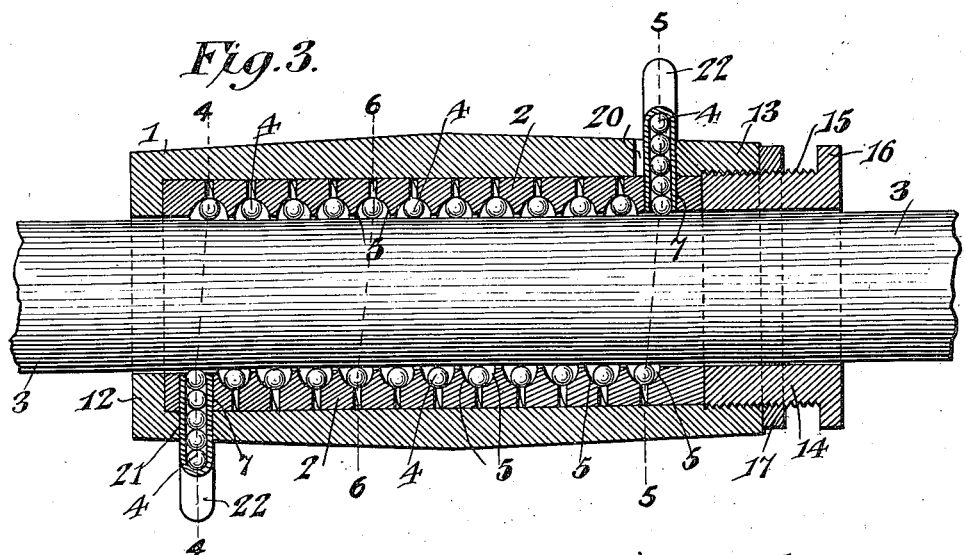
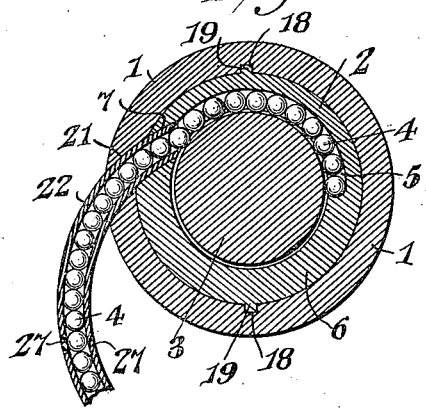
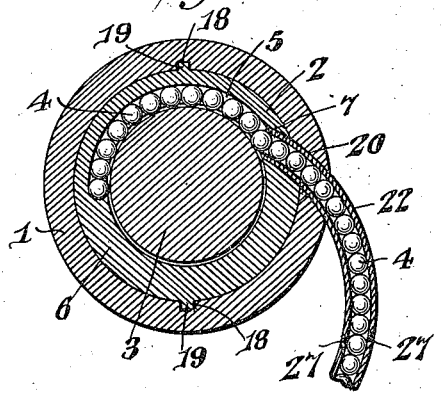
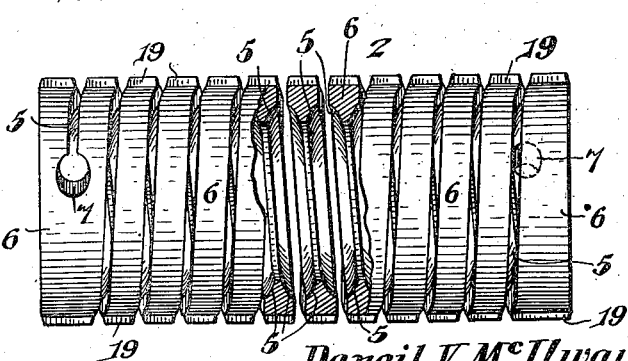
WITNESSES
Daneil V. McIlwain, INVENTOR
BY
ATTORNEY

UNITED STATES PATENT OFFICE.

DANEIL V. McILWAIN, OF SCOTTSBLUFF, NEBRASKA, ASSIGNOR OF ONE-HALF TO MARTIN MONTZ, OF SCOTTSBLUFF, NEBRASKA.

BALL-BEARING.

1,185,114. Specification of Letters Patent. Patented May 30, 1916.

Application filed June 9, 1914. Serial No. 844,001.

*To all whom it may concern:*

Be it known that I, DANEIL V. McILWAIN, a citizen of the United States, residing at Scottsbluff, in the county of Scotts Bluff and State of Nebraska, have invented a new and useful Ball-Bearing, of which the following is a specification.

The invention relates to improvements in ball bearings for shafting.

The object of the present invention is to improve the construction of ball bearings and to provide a simple and efficient self-lubricating and self-cleansing ball bearing of durable and inexpensive construction, adapted to distribute the friction on a shaft and relieve the balls of friction during a part of their travel through the bearing, and capable of producing a circulation of oil and of subjecting the balls to the action of the air and a lubricating bath while they are not subject to the friction of the bearing.

A further object of the invention is to provide a ball bearing of this character which may be equipped with any desired number of balls to compensate properly for the amount of wear to which the bearing may be subjected, and in which the balls will be automatically spaced and prevented from crowding.

Another object of the invention is to provide a ball bearing adapted to hold a relatively large amount of lubricant, so that it will require attention only at intervals of considerable length of time, and equipped with means for returning the oil from the ball race of the bearing to the bath receptacle and for removing the impurities from the oil before delivering the same to the bath receptacle.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawings:—Figure 1 is a side elevation, partly in section, of a ball bearing constructed in accordance with this invention. Fig. 2 is an end elevation of the same. partly in section. Fig. 3 is a horizontal sectional view of the ball bearing. Fig. 4 is a transverse sectional view on the line 4—4 of Fig. 3. Fig. 5 is a transverse sectional view on the line 5—5 of Fig. 3. Fig. 6 is a transverse sectional view on the line 6—6 of Fig. 3. Fig. 7 is a vertical longitudinal sectional view of the casing or housing. Fig. 8 is an elevation of the ball race member, partly broken away, to illustrate the construction of the face forming coils or convolutions.

Like numerals of reference designate corresponding parts in all the figures of the drawings.

In the accompanying drawings, in which is illustrated the preferred embodiment of the invention, 1 designates a substantially cylindrical casing forming a housing for a ball race member 2, which is adapted to surround a shaft 3 and maintain antifriction balls 4 in engagement with the same. The ball race member, which is constructed of suitable metal, is in the form of a cylindrical spiral, and consists of spaced coils or convolutions oppositely beveled at their inner edges to provide concave side faces 5 which form a spiral ball race having side and rear walls. The balls travel along the spiral ball race out of contact with the casing. The terminal coils or convolutions 6 of the ball race member are enlarged and are provided with openings 7 communicating with the ends of the spiral ball race and forming entrance and exit passages for the antifriction balls, which are forced to travel along the spiral race by the rotary movement of the shaft 3. The ball race member is spaced from the shaft by the antifriction balls 4, which enable the shaft to rotate in the bearing with a minimum amount of friction.

The cylindrical casing 1 is enlarged at the top to form an attaching portion 9 having a flat upper face 10 and provide with laterally projecting ears 11 which are perforated for the reception of bolts or other suitable fastening devices. The bearing, which may, in practice, be arranged in any desired position, is designed to be supported and fastened in the usual manner. The casing is provided at one end with an integral flange 12, which forms an abutment for the adjacent end of the ball race member and the other end 13 of the casing is interiorly threaded for the reception of an adjusting sleeve 14, having exterior screw threads 15 for engaging the interiorly threaded portion of the casing. The adjusting sleeve abuts against the adjacent end of the ball race member and is adapted to engage the interior threads of the casing for maintaining the race member in proper position, and also for compressing the same to take up any wear of the antifriction balls and the spiral race. The spiral race member is sufficiently resilient to permit a compression of its coils or convolutions to take up the wear of the balls. The adjusting sleeve 14 is provided at its outer end with a polygonal wrench receiving flange 16, and it is equipped with a lock or jam nut 17 arranged on the threaded sleeve and engaging the adjacent end of the casing. In order to hold the race member against rotary movement within the cylindrical casing, the latter is provided with opposite longitudinal grooves 18, which are slidably engaged by ribs 19 projecting from the exterior of the coils or convolutions of the race member at diametrically opposite points. The grooves are preferably located at the top and bottom of the casing, as shown, but they may be arranged at any other desired point, and one or more may, of course, be employed. The projecting ribs of the coils or convolutions interlock the same with the grooves and permit the said coils or convolutions to slide longitudinally within the casing when the sleeve 14 is adjusted to take up the wear.

The casing is provided at its end portions with openings 20 and 21, registering with the openings 7 of the race member and receiving terminal portions of a ball conduit consisting of a pipe or tube 22 of approximately U-shape, composed of curved sides and a connecting curved bottom portion forming a continuously curved passage for the antifriction balls. The curved sides depend from the casing, so that the balls move downwardly within the same at one side of the conduit, and travel upwardly through the other side of the conduit. The terminal portions of the pipe or tube extend through the openings 20 and 21 and are suitably secured within the apertures 7 of the race member, and terminate at their lower edges adjacent to the shaft, as illustrated in Figs. 4 and 5 of the drawings. The upper edges of the end portions of the tube or pipe are spaced from the shaft to permit the balls to pass freely into the tube or pipe at one end, and out of the same at the other end. The rotary motion of the shaft causes the balls to be discharged from one end of the spiral ball race, and as the balls leave the ball race and enter the ball tube or pipe, they will be in contact with each other and will remain in contact as they race through the said pipe. The balls being discharged with force from the ball race, will cause them to crowd in the ball pipe and return to and reënter the ball race, according to the space provided for them, and they will automatically space themselves in the spiral ball race and be prevented from crowding while traveling through the same. The ball bearing is neither right nor left, and the balls are adapted to travel in either direction, according to the rotation of the shaft, but when several ball bearings are employed, they are preferably reversed. The number of the coils or convolutions, the pitch of the same, and the length of the ball pipe or tube and the consequent number of balls, may be varied to satisfy the requirement of the bearing, and to enable any amount of friction to be properly compensated for. The spiral ball race distributes the friction on the shaft and the exterior ball conduit relieves the balls of friction during a portion of the time. The friction is thereby reduced to a minimum, the durability or life of the balls is increased, and the tendency of the balls to heat is lessened. The opening 20, which is located adjacent to the adjusting sleeve, is elongated sufficiently to permit the necessary adjustment of the sleeve, without allowing the adjacent terminal of the ball pipe or tube to come in contact with the inner end wall of the elongated opening 20.

The lower curved connecting portion of the ball pipe or conduit extends through an oil bath receptacle 23 and is provided with a sufficient number of apertures 24 to subject the balls traveling through the pipe or tube 22 thoroughly to the action of the oil contained within the receptacle 23. The balls traveling through the pipe or tube 22 and through the ball race cause a circulation of oil through the bearing, and the oil collecting at the bottom of the cylindrical casing is returned to the bath receptacle 23 by a drain pipe 25, consisting of an upper centrally arranged vertical portion and an inclined portion extending downwardly from the vertical portion to a suitable filter 26, which is located at the top of the oil bath receptacle at one end thereof. The filter 26, which may be of any preferred construction, is adapted to remove any impurities from the oil, which is returned to the oil bath receptacle in a clean condition. The balls are subjected to the oil bath while they are relieved of the friction of the bearing, and they return to the same thoroughly lubricated and at a reduced temperature. The oil bath receptacle may be of any desired capacity and it will enable the ball bearing to be supplied with a relatively large amount of oil so that it will require attention only at considerable intervals, say, once a month. The balls may also be subjected to the cooling action of the air, and for this purpose the ball pipe or tube may be provided with vent apertures 27, extending downwardly and inwardly at an inclination to cause the air to be drawn in without permitting the escape of the oil.

The balls may directly contact with the shaft or a sleeve of case hardened metal or other suitable material may be interposed between the balls and the shafting.

What is claimed is:—

1. A ball bearing including a race member having an opening and adapted to surround a shaft, said race member being provided with an interior ball race extending around the shaft receiving opening, antifriction balls, a casing housing the race member, a ball pipe connected at its terminals with the ball race and extending downwardly from the casing and provided in its lower portion with apertures, an oil bath receptacle receiving the lower portion of the ball pipe, and a drain pipe connecting the casing with the bath receptacle for returning the oil thereto.

2. A ball bearing including a casing, a race member having an opening and adapted to surround a shaft, said race member being provided with an interior ball race extending around the shaft receiving opening, antifriction balls, and a ball pipe arranged exteriorly of the casing and connected at its ends with the terminals of the ball race and provided with inclined vent apertures arranged to permit the entrance of air and prevent the escape of oil passing through the said pipe.

3. A ball bearing including a casing, antifriction balls, a spiral race member interposed between the casing and the balls and composed of substantially cylindrical coils or convolutions and having an interior spiral ball race adapted to permit antifriction balls to travel spirally around a shaft.

4. A ball bearing including a casing, antifriction balls, a spiral race member interposed between the balls and the casing and having a shaft receiving opening and composed of approximately cylindrical coils forming an intervening spiral ball race.

5. A ball bearing including a casing, antifriction balls, a spiral race member interposed between the casing and the balls and composed of substantially cylindrical coils or convolutions and having an interior spiral ball race formed entirely by the said race member and adapted to permit antifriction balls to travel spirally around a shaft, and means for compressing the coils or convolutions to take up the wear on the balls.

6. A ball bearing including a casing, antifriction balls, a spiral race member interposed between the balls and the casing and located within the casing and composed of substantially cylindrical convolutions forming an intervening spiral ball race and compressible to take up the wear on the balls, and an adjusting sleeve threaded into one end of the casing and engaging the spiral race member.

7. A ball bearing including a casing having a shaft receiving opening and provided at one end thereof with an annular flange, said casing being also provided at its end portions with openings, the opening at the end remote from the flange being elongated, antifriction balls, a spiral longitudinally compressible race member arranged within the casing and fitted at one end against the said flange and having a spiral ball race, an exterior ball conduit extending through the openings of the casing and connected with the terminals of the ball race, and means carried by the casing for engaging and compressing the ball race member.

8. A ball bearing including a casing having a shaft receiving opening, and a ball race member arranged within the casing and having an interior spiral ball race and compressible to take up the wear on the balls, said casing and ball race member having coacting means for slidably interlocking the latter with the former.

9. A ball bearing including a casing having opposite grooves, and a spiral race member arranged within the casing and having an interior spiral ball race, said race member being compressible to take up the wear on the balls and provided at its coils or convolutions with projecting means for slidably engaging the said grooves.

10. A ball bearing including a casing, antifriction balls, a spiral race member interposed between the balls and the casing composed of approximately cylindrical coils or convolutions oppositely beveled at their inner edges to provide side bearing faces, the bearing faces of the adjacent coils or convolutions forming an intervening ball race.

11. A ball bearing including a casing, antifriction balls, a spiral race member interposed between the balls and the casing and having coils or convolutions oppositely beveled at their inner edges to form an intervening spiral ball race having side and rear walls, the end coils or convolutions being enlarged and provided with openings located at the ends of the ball race and extending through the rear walls to form entrance and exit passages for the balls.

12. A ball bearing comprising a casing, a contractible and expansible ball race member mounted in the casing, a shaft extending through the race member, balls, said race member causing the balls to contact with the shaft in their travel around the shaft, means connected to the race member for conducting the balls from and to the race member, and means for lubricating the balls as they are conducted by said first mentioned means from and to the race member.

13. The combination with a casing having a spiral ball race therein, and a plurality of ball bearings in said race for supporting a shaft in the casing, of a substantially U-shaped pipe secured at its ends to the opposite ends of said casing and opening into the opposite ends of said race to provide therewith a circuitous passage for the balls in the race, an oil bath receptacle arranged below and independent of the casing, said pipe being looped downwardly below the casing into the receptacle and having a plurality of openings in its lower portion to admit oil from the receptacle into the pipe about the balls, the pipe also having air openings adjacent its upper ends to admit air to the pipe for cooling the balls, a drain leading from the casing downwardly into the receptacle to return oil thereto raised by the balls in the pipe, and a filter on the lower end of said drain pipe.

14. The combination with a casing having a spiral ball race therein, a plurality of ball bearings in said race for supporting a shaft in the casing, and an independent oil bath receptacle arranged outside of the casing, of a pipe secured at its opposite ends to the casing and communicating with the opposite ends of said ball race to receive balls therefrom and to deliver the balls thereto, the intermediate portion of said pipe being adapted to dip into said receptacle and having openings in the sides thereof to admit oil to the pipe about the balls, without liberating the latter, and a drain pipe leading from said casing to the receptacle to remove oil collected in the casing carried from the receptacle by the balls.

In testimony that I claim the foregoing as my own I have hereto affixed my signature in the presence of two witnesses.

DANEIL V. McILWAIN.

Witnesses:
R. A. GRIGSBY,
G. L. SHUMWAY.